United States Patent [19]

Hughes

[11] Patent Number: 4,883,833

[45] Date of Patent: Nov. 28, 1989

[54] PROCESS FOR PRODUCING A DRY GRANULAR PRODUCT

[76] Inventor: Ronald E. Hughes, P.O. Box 820, Davidson, N.C. 28036

[21] Appl. No.: 208,144

[22] Filed: Jun. 15, 1988

[51] Int. Cl.$^4$ .............................................. C08K 5/09
[52] U.S. Cl. ................................... 524/394; 524/424; 524/548; 524/588
[58] Field of Search ................ 524/394, 548, 588, 424

[56] References Cited

U.S. PATENT DOCUMENTS

| 3,454,513 | 7/1969 | Azarian | 524/394 |
| 4,473,485 | 10/1984 | Greene | 252/174.24 |
| 4,695,397 | 10/1987 | Sommer et al. | 524/41 |

Primary Examiner—Joseph L. Schofer
Assistant Examiner—Jeffrey T. Smith
Attorney, Agent, or Firm—Shefte, Pinckney & Sawyer

[57] ABSTRACT

Dry sodium carbonate is reacted with acetic acid and a polymer emulsion according to the following equation:

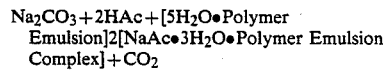

$Na_2CO_3 + 2HAc + [5H_2O \bullet Polymer\ Emulsion] 2[NaAc \bullet 3H_2O \bullet Polymer\ Emulsion\ Complex] + CO_2$ wherein the polymer is inert with respect to sodium carbonate and acetic acid so as to maintain the integrity of the polymer during the reaction, which results in a dry granular product in the form of an aqueous polymer complex of sodium acetate trihydrate.

4 Claims, No Drawings

PROCESS FOR PRODUCING A DRY GRANULAR PRODUCT

BACKGROUND OF THE INVENTION

The present invention relates to producing sodium acetate polymer emulsion complexes and more particularly to producing such complexes in which the integrity of the polymer emulsion is maintained during the process so that a dry granular product is obtained, yet the emulsion has retained its original water relationship.

As is well known, polymer emulsions have many useful forms. Conventionally, they are produced in liquid form and are applied to a particular use in liquid form that are diluted to provide the desired concentration for the particular application. The storing, transporting and handling of liquid emulsions is obviously more complicated and difficult than were the emulsion in a solid form. Also, liquid emulsions are susceptible to freeze/thaw instability.

Sodium acetate is known for use in controlling acidity and as a dilutant, i.e. in dyestuff blends. Sodium acetate has also been used by the present inventor in a prior art process with dodecyl benzene sulfonic acid to produce sodium dodecyl benzene sulfonate as a dry detergent in granular form, but such prior art process involved a reaction of the sodium acetate and the dodecyl benzene sulfonic acid such that the dodecyl benzene sulfonic acid was changed chemically to sodium dodecyl benzene sulfonate and the process also involved a highly effervescent reaction that was difficult to control.

SUMMARY OF THE INVENTION

In contrast to the above-described prior art, it has been discovered by the present invention that a dry granular complex of sodium acetate trihydrate can be produced by reacting sodium carbonate and acetic acid in the presence of a polymer emulsion where the polymer is inert with respect to the sodium carbonate and acetic acid such that the product retains the water of hydration sourced from the emulsion while maintaining the integrity of the polymer in the resultant product. It is believed that the water in the emulsion is appropriated by the reaction into the resultant product without affecting the water/polymer relationship.

According to the present invention, the process involves pre-blending of the ingredients of the sodium acetate trihydrate molecule with polymer emulsions, with the sodium acetate using the water from the emulsion to cause the reaction to take place and resulting in a dry product which in fact contains the polymeric product whose water based properties remain intact. This new process allows complex polymeric products, such as silicone emulsions, to be compounded into granular products previously incompatible with the aqueous polymeric emulsions due to their water content. In addition to silicon emulsions, this process has application to acrylic emulsions, surfactant solutions and polyvinylpyrrolidone solutions.

DESCRIPTION OF THE PREFERRED EMBODINENT

According to the preferred embodiment of the present invention, dry sodium carbonate is reacted with acetic acid and a polymer emulsion according to the following equation:

$$Na_2CO_3 + 2HAc + [5H_2O \bullet \text{Polymer Emulsion}] \rightarrow 2[NaAc \bullet 3H_2O \bullet \text{Polymer Emulsion Complex}] + CO_2$$

The polymer is inert with respect to the sodium carbonate and acetic acid so as to maintain the integrity of the polymer during the reaction. Preferably, the process is performed at a mole ratio of acetic acid to the water content of the polymer emulsion that is two moles of acetic acid to five moles of water. Also, preferably, the polymer emulsion is a high solids, non-crosslinking, polymer emulsion. In the preferred embodiment, the polymer emulsion is selected from the group of silicone emulsions, acrylic emulsions, surfactant solutions, and polyvinylpyrrolidone solutions. The process is applicable to materials, such as sodium acetate, having water of hydration and would have no application to materials that do not have water of hydration.

The reaction is sufficiently exothermic to create heat to dry the product.

The process of the present invention has been practiced according to the following examples:

EXAMPLE I

Using a silicone defoamer emulsion by Union Carbide known as Defoamer SAG-30, 26.4 grams of dry sodium carbonate was reacted with 30.6 grams of acetic acid in the presence of a preblended mixture of 13.0 grams of water and 30.0 grams of Defoamer SAG-30. The reaction mixture was stirred for approximately 1.0 hour to yield 79.2 grams of a product representing Defoamer SAG-30 in a more dilute but completely dry form.

EXAMPLE II

Using a silicone emulsion by Union Carbide known as LE-458 HS, 26.4 grams of dry sodium carbonate and 30.6 grams of acetic acid were reacted in the presence of a preblended mixture of 30.0 grams of LE-458 HS and 13.0 grams of water. The reaction mixture was stirred for approximately 1.0 hour to yield 80.0 grams of a dry powdered form of LE-458 HS which was more dilute in concentration than the original form of the product LE-458 HS.

EXAMPLE III

Using a 30% solution of polyvinylpyrrolidone, 26.4 grams of dry sodium carbonate was reacted with 30.6 grams of acetic acid in the presence of 30.0 grams of a 30% polyvinylpyrrolidone solution. This reaction mixture was stirred for approximately 1.0 hour to yield 78.0 grams of a dry, more dilute polyvinylpyrrolidone.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

When used in the following claims, the term polymer emulsion is intended to have a broad meaning encompassing not only polymer emulsions in a strict sense, but also materials, such as surfactant solutions and polyvinylpyrrolidone solutions, that have similar characteristics in terms of the application of the process of the present invention.

I claim:

1. A process for producing a dry granular product in the form of an aqueous polymeric complex of sodium acetate trihydrate, comprising reacting dry sodium carbonate, acetic acid and a polymer emulsion selected from the group of silicone emulsions, acrylic emulsions, surfactant solutions, and polyvinylpyrrolidone solutions wherein the polymer is inert with respect to sodium carbonate and acetic acid so as to maintain the integrity of said polymer during said reaction.

2. The process according to claim 1 and characterized further in that the mole ratio of acetic acid to the water content of the polymer emulsion is two moles of acetic acid to five moles of water.

3. A process according to claim 1 and characterized further in that the reaction is in accordance with the following equation:

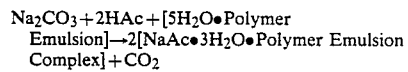

4. A process according to claim 1 and characterized further in that said polymer emulsion is a high solids, non-crosslinking, polymer emulsion.

* * * * *